United States Patent [19]

Parker

[11] 4,003,294
[45] Jan. 18, 1977

[54] HYDRAULIC POWER MECHANISM WITH CONTROL DEVICE ACTUATOR

[75] Inventor: Donald L. Parker, Middletown, Ohio

[73] Assignee: General Motors Corporation, Detroit, Mich.

[22] Filed: Apr. 30, 1976

[21] Appl. No.: 681,771

[52] U.S. Cl. ............................. 91/49; 91/369 A; 60/328; 60/404; 60/484
[51] Int. Cl.² ..................................... F15B 13/02
[58] Field of Search ................ 91/49, 369 A, 376; 60/328, 404; 91/6

[56] References Cited

UNITED STATES PATENTS 3,691,903  9/1972  Shellhause ................. 91/369 A X
3,802,195  4/1974  Lewis ............................ 60/404 X Primary Examiner—Edgar W. Geoghegan
Attorney, Agent, or Firm—D. D. McGraw

[57] ABSTRACT

A vehicle hydraulic power brake and steering system has a hydraulic brake booster provided with a mechanism for operating a switch to indicate loss of hydraulic power, and for operating a control valve for admitting hydraulic pressure from another source such as an accumulator. The mechanism includes an actuating bar mounted in a recess formed in the wall of the hydraulic brake booster power cylinder and lying in the power chamber of the booster. The bar extends axially for a distance substantially equal to the power stroke of the power piston. An annular valve seat has a ramped groove which actuates a ball positioned in a radially extending passage of the booster piston and engaging the actuating bar in rolling contact. So long as hydraulic power pressure is available, the ramped groove does not move the ball radially outward. When this pressure is lost, the annular valve seat will be moved axially relative to the power piston, forcing the ball radially outward and moving the actuating bar radially outward to close the warning switch and to open the accumulator control valve.

2 Claims, 4 Drawing Figures

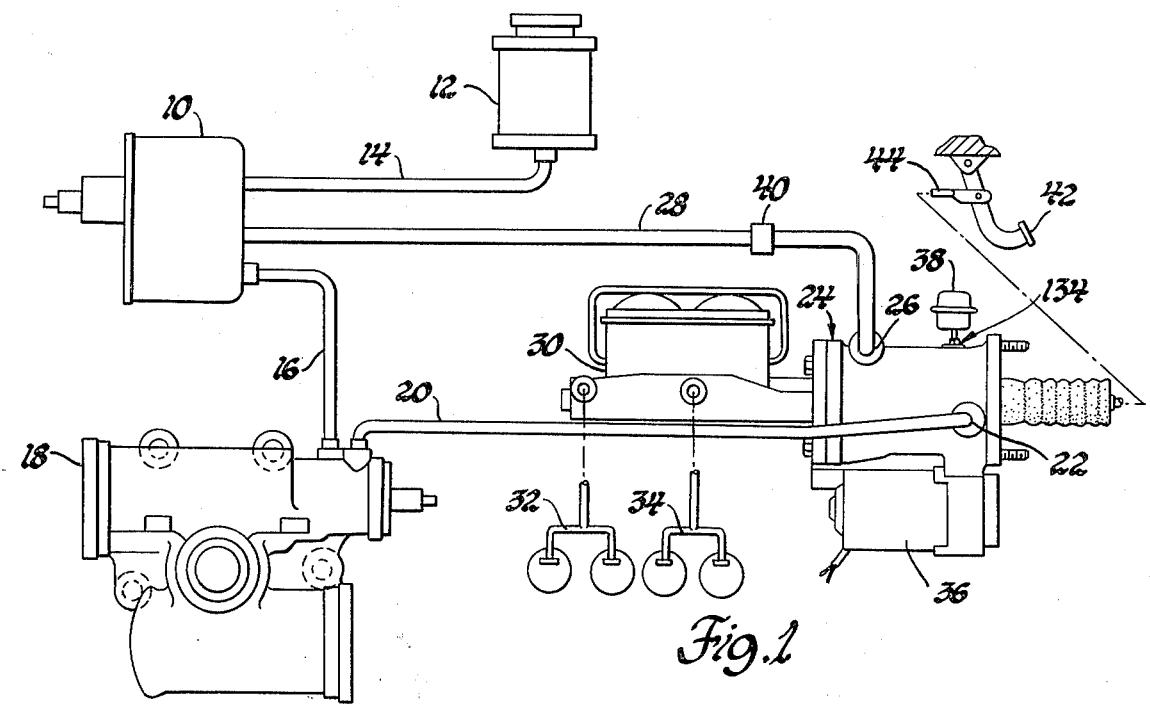
Fig. 1
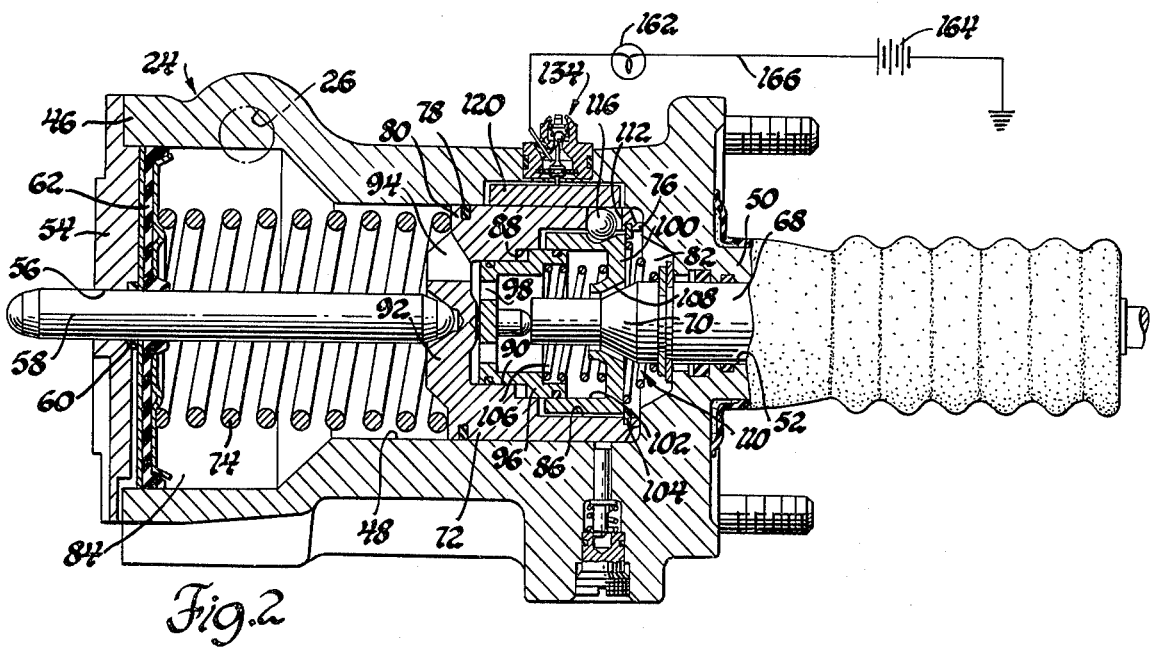
Fig. 2
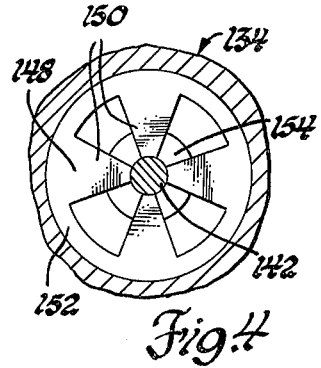
Fig. 4
Fig. 3

HYDRAULIC POWER MECHANISM WITH CONTROL DEVICE ACTUATOR

The invention relates to a control device actuating arrangement sensitive to pressure loss in a hydraulic power mechanism, and particularly to such an arrangement in which an actuating bar is movable to actuate one or more control devices. The arrangement for moving the actuating bar includes a ball and ramp in interrelated parts which normally will not move axially relative to each other, but upon loss of power pressure such relative movement will occur. The ramped groove then forces the ball to move in a linear direction and cause the actuating bar to actuate the control device. By way of example, the control device may be a failure warning switch, a control valve for a pressurized accumulator to admit pressure to the hydraulic power mechanism, or a combination of such arrangements.

In The Drawing

FIG. 1 is a schematic representation of a vehicle power steering and brake system embodying the invention in the power brake mechanism.

FIG. 2 is a cross-section view, with parts broken away, of the hydraulic brake booster used in the system of FIG. 1, and including a schematic electrical circuit for failure warning.

FIG. 3 is an enlarged section view of a portion of the booster mechanism illustrated in FIG. 2, with parts broken away.

FIG. 4 is a view taken in the direction of arrows 4—4 of FIG. 3 and illustrating a portion of the mechanism in that Figure.

In the system shown in FIG. 1 the power steering pump 10 is provided with a hydraulic fluid reservoir 12 connected to the input side of the pump by conduit 14. A pump output 16 is connected to the power steering gear 18, which is of the open-center type so that in the at-rest position hydraulic fluid is pumped freely through the gear. The conduit 20 connects the output side of the power steering gear 18 with the inlet 22 of the hydraulic power brake booster 24. Booster 24 is the hydraulic power mechanism in which the invention is embodied. The booster outlet 26 is connected to the sump or inlet side of power steering pump 10 by conduit 28, thus completing the hydraulic fluid circuit.

The booster 24 is connected to actuate a master cylinder assembly 30 which provides brake pressure to a front brake circuit 32 and a rear brake circuit 34. The brake circuits are parts of the vehicle in which the hydraulic system is installed. The booster 24 is also illustrated as being provided with an electrohydraulic pump 36 which is actuated when necessary to provide sufficient hydraulic fluid flow and pressure availability to operate the booster 24 when insufficient hydraulic fluid flow and pressure availability are provided through conduit 20. The booster is also illustrated as being provided with an accumulator 38 which will provide pressure if needed when no pressure is available from either pump 10 or pump 36. Accumulator pressure would only actuate the booster for a short period of time, but would enable the operator to stop the vehicle under power boost should that be necessary. The pump 36 is arranged to be actuated as necessary, and may be actuated by a flow switch 40 provided in conduit 28. The booster assembly 24 is schematically illustrated as being controlled by a vehicle brake pedal 42 which actuates a push rod 44 as the booster input member.

The booster assembly 24 is illustrated in greater detail in FIG. 2. A booster housing 46 is formed to provide a power cylinder 48. The rear end 50 of cylinder 48 includes a rearwardly extending sleeve which is provided with a bore 52. Bore 52 extends through the sleeve and the end wall formed by the cylinder rear end and is axially aligned with cylinder 48. The forward end 54 of the housing 46 includes a cylinder cover which is provided with a central aperture 56 in axial alignment with cylinder 48 and bore 52. The booster output push rod 58 extends through aperture 56 and is reciprocably moved when the brake is operated. A suitable seal 60 cooperates with push rod 58 and is mounted in the cover defined by forward end 54. A cylinder seal 62 is received adjacent cover 54.

A booster push rod 68 is actuated by the push rod 44. Push rod 68 is sealingly and reciprocably mounted in bore 52. The forward end of the push rod is formed to provide a valve member 70. A power piston 72 is reciprocably and sealingly mounted in power cylinder 48 so that it engages output push rod 58. A piston return spring 74 urges the piston toward its rest position in which the piston rear end 76 engages the rear end 50 of the cylinder 48. A seal 78 is installed in the outer periphery of the piston adjacent the piston forward end 80 so that the majority of the piston length is exposed along its outer surface to pressure in the power pressure chamber 82. Chamber 82 is formed by the piston 72, the rear end of cylinder 48, and the end wall defined by the rear end 50 of the cylinder. Inlet 22 opens into chamber 82. An exhaust chamber 84 is on the other side of the piston 72 from chamber 82. Spring 74 is located in the exhaust chamber and the outlet 26 is connected to the exhaust chamber. Power piston 72 has a stepped recess opening toward the rear of the power cylinder and defining cylinders 86, 88 and 90, with cylinder 86 being adjacent the rear end 76 of the piston and cylinder 90 being adjacent the forward end 92 of the piston. A passage 94, formed through piston forward end 92, combines with the recess defining cylinders 86, 88 and 90 to provide a connecting passage between chambers 82 and 84. A stepped reaction member 96 is generally cup-shaped and is reciprocably received in cylinder 90 at its forward end. Openings 98 are provided in the reaction member to permit fluid flow therethrough. The annular valve seat 100 is reciprocably received in cylinder 86 and has its inner wall defining a cylinder 102. The rear end of reaction member 96 is sealingly and reciprocably received in cylinder 102 and is also received in a portion of cylinder 88. A stop 104 is inserted in the end of cylinder 86 adjacent piston end 76 and normally has annular valve seat 100 engaging it. A spring 106 is installed axially between reaction member 96 and valve seat 100 to continually urge the valve seat toward engagement with stop 104 and the reaction member forwardly toward engagement with the piston forward end 92. Valve seat 100 has an annular valve seat surface 108 which is axially positioned to cooperate with valve 70 to define the booster open center control valve assembly 110. Fluid normally flows from conduit 20 through inlet 22 into chamber 82, between valve 70 and seat surface 108, through the reaction member 96, and passes through passage 94 into exhaust chamber 84. It then goes through outlet 26 and is returned to pump 10. When the brake booster is actuated, valve 70 is moved axially toward seat surface 108 to restrict this flow and cause an increase in pressure in power pressure chamber 82. The pressure differential therefore established across power piston 72 will cause the piston to move leftwardly, as seen in FIG. 2, against spring 74, thereby moving push rod 58 and actuating master cylinder 30. The pressure in chamber 82 passes between the valve seat 100 and cylinder 86 and also between a portion of reaction member 96 and cylinder 88 so that it acts in a rightwardly direction tending to hold the valve seal against stop 104 and also urging the reaction member rightwardly. The force so exerted on the reaction member is transmitted to the vehicle operator from the reaction member to valve 70 and the rod 68 on which that valve is formed. Thus in normal operation the valve seat 100 remains against stop 104.

The portion of the booster so far described is much like the booster disclosed and claimed in U.S. Pat. No. 3,691,903, entitled "Hydraulic Power Brake Booster", issued Sept. 19, 1972. That patent also discloses and describes the power steering and brake booster hydraulic system, except for accumulator 38, in further detail. Reference may be made to that patent for additional details of booster and general system operation.

Power piston 72 has a radially extending aperture 112 through its skirt adjacent its end 76 so that the aperture opens into cylinder 86 and also into a portion of power chamber 82. As earlier noted, the power chamber is considered to extend along the outer periphery of piston 72, terminating where seal 78 engages cylinder 48. The valve seat 100 has a ball-receiving ramp groove 114 formed in its outer periphery and in radial and circumferential alignment with aperture 112. The ramp of the groove 114 extends radially outward and axially toward the power chamber from the deepest part of the groove. A ball 116 is positioned in aperture 112 for relatively free movement therein, the ball normally being received in the deepest part of groove 114, which is at the bottom of the ramp forming the groove and at the forward end of the ramp. The diameter of ball 116 is somewhat greater than the thickness of the portion of power piston 72 through which aperture 112 extends. Its diameter is such that the uppermost point of the ball is substantially aligned with the outer surface of power piston 72 when the ball is fully seated in groove 114, as shown in FIG. 2.

A recess 118 is formed in the wall of power cylinder 48 and so axially extends that it is always within the power pressure chamber 82. The axial length of recess 118 is preferably somewhat greater than the maximum power stroke of power piston 72. Aperture 112 is circumferentially and radially aligned with recess 118. An actuating bar 120 is mounted in recess 118, the bar extending axially along the power cylinder wall for a distance at least substantially equal to the power stroke of the power piston 72. Actuating bar 120 also continually lies in the power pressure chamber 82. Ball 116 is in rolling contact with the bar at point 122 in any operational axial position of the power piston 72. The rolling point of the contact 122 merely moves axially along the bar as piston 72 is moved axially in cylinder 48. Bar 120 is somewhat less thick in a radial direction than the depth of recess 118 so that the bar can be moved radially outward under certain conditions. The bar is normally held in contact with ball 116 by radially extending spring loaded means 124.

The housing 46 has a recess 126 extending radially toward recess 118 and connected therewith by an aperture 128. Means 124 extends through aperture 128 so that it engages the bar 120 substantially centrally between the bar ends 130 and 132. A control device 134 is sealingly installed in recess 126, and means 124 is a part of this device. The control device includes valve 136 and a switch 138, each of which is also a control device. Valve 136 is a ball check valve contained in a passage 140 which is in turn connected to accumulator 38. The pin 142, which is a part of means 124, extends toward passage 140 and in the position shown in FIG. 3 opens valve 136 by lifting the ball from its seat 144 against the force of valve spring 146. Pin 142 is mounted on a spring 148 which is generally circular, as better illustrated in FIG. 4, and has spring fingers 150 extending inwardly from the spring peripheral portion 152. The spring fingers 150 engage pin 142 in a spring-receiving slot 154 and normally hold pin 142 downwardly as viewed in FIGS. 2 and 3 so that the pin lower end 156 engages bar 120 and urges the bar toward power piston 72. An insulated contact 158 extends through the housing of control device 134 and terminates adjacent a portion of pin 142 defining another contact 160. Contacts 158 and 160 are elements of switch 138. When pin 142 is in the position shown in FIG. 2, with actuating bar 120 lying in surface engagement along the outer periphery of piston 72, contacts 158 and 160 are separated and valve 136 is closed. When pin 142 is moved upwardly against the force of spring 148, as shown in FIG. 3, contacts 158 and 160 close and valve 136 is opened.

In normal operation, power piston 72 will move leftwardly as seen in FIGS. 2 and 3 while valve seat 100 remains in engagement with stop 104. Therefore ball 116 will not move actuating bar 120 radially outward. However, if there is insufficient power pressure in chamber 82 to act against valve seat 100 and hold it against stop 104, and movement of valve 70 has engaged that valve with valve seat surface 108, spring 106 will be compressed so that valve seat 100 moves leftwardly relative to power piston 72. This causes the ramped groove 114 to force ball 116 radially outward by camming action, moving a part of actuating bar 120 upwardly. If this occurs in the initial portion of the power stroke, as seen in FIG. 3, bar end 132 will move upwardly until it strikes the bottom of recess 118. This causes a pivoting action of the bar 120 about the corner of end 130 engaging piston 72, causing pin 142 to move upwardly to actuate the control device. It can be seen that sufficient movement of bar 120 will always occur to actuate the control device when it is designed to be so actuated in the condition shown in FIG. 3.

When the control device is partially or totally composed of switch 138, it can be seen that indicator 162 is energized. This indicator is contained in series with the battery or other suitable source of electricity 164 in the indicator circuit 166. The circuit is connected to contact 158 and, through ground, with contact 160. When the control device is composed in part or totally of valve 136, actuation of the valve permits stored pressure in accumulator 38 to pass through passage 140 and aperture 128 into the power chamber through recess 118. Since under this condition the valve 70 is closed against valve seat surface 108, the accumulator pressure will move the power piston 72 leftwardly to actuate the brake. Of course, this pressure will be lost when the brake is released and therefore the booster can only be actuated one or two times before the accumulator has exhausted its pressure. This arrangement therefore provides a third back-up pressure system to the power steering pump 10 and the electrohydraulic pump 36, and is used to obtain an emergency stop of the vehicle when no pressure is otherwise available. The vehicle operator will be aware that he probably has no additional power pressure for additional stops because of the energization of indicator 162.

What is claimed is:

1. In a hydraulic power mechanism having a housing; a power cylinder formed in said housing; a power piston reciprocably received in said housing and dividing said power cylinder into a power pressure chamber and an exhaust chamber and having passage means therein connecting said chambers; an open center control valve assembly in said passage means for controlling fluid passage therethrough from said power pressure chamber to said exhaust chamber and including a movable valve, an annular valve seat reciprocably received in a second cylinder defining a portion of said passage means, a reaction member reciprocably received in a third cylinder defining another portion of said passage means and also reciprocably received in a fourth cylinder formed in a part of said annular valve seat; spring means continually urging said reaction piston toward said exhaust chamber and said valve seat toward said power chamber and in valving relation with said valve; and a stop on said power piston normally engaged by said valve seat under influence of said spring means; the improvement comprising:

an actuating bar mounted in a recess formed in the wall of said housing power cylinder radially outward of said power piston, said bar extending axially at said power cylinder wall for a distance substantially equal to the power stroke of said power piston and continually lying in said power chamber;

said power piston having a radially extending aperture adjacent the end thereof facing said power chamber and opening into said second cylinder and into said power chamber in radial alignment with said bar;

a ball-receiving ramped groove in said valve seat in radial and axial alignment with said aperture with the groove ramp extending radially outward and axially toward said power chamber;

a ball in said aperture and said ramped groove and having a rolling point of contact with said bar in any operational axial position of said piston;

and radially extending spring loaded means spring loading said bar substantially centrally between the ends thereof to continually urge said bar into engagement with said ball and yieldably permit radially outward movement of said bar caused by radially outward movement of said ball, said spring loaded means when yieldably permitting such movement actuating a control device;

said ball being moved radially outward by axial movement of said valve seat and said ramped groove relative to said aperture, said axial movement occurring in response to axial engagement and subsequent concurrent movement of said valve and said valve seat relative to said power piston against the force of said spring means.

2. A control assembly for a switch or valve and the like in response to a predetermined condition, said control assembly comprising:

a housing having a cylinder wall defining a cylinder, a first piston axially movable in said cylinder for a predetermined maximum stroke, a recess in said cylinder wall extending axially parallel to the axis of said cylinder, a control bar received within said recess and extending axially parallel to the axis of said cylinder a distance at least equal to said first piston predetermined maximum stroke and always having at least a portion thereof in radially juxtaposed relation to said first piston, a force-biased pin in said housing and extending into said recess and engaging said bar between the ends thereof and continually urging said bar radially inwardly of said cylinder, said pin being axially movable in a radially outward direction by movement of said bar in said recess radially outward of said cylinder to actuate a switch or valve and the like, a second piston reciprocably received in a cylinder formed in said first piston and force-biased to a first axial position, and means mounted in said first piston and operatively continually engaging said bar and said second piston and movable radially but not axially relative to said first piston, said means being responsive to axial movement of said second piston toward a second position to move said means radially outward and thereby move said bar radially outward to move said pin axially in a radially outward direction to actuate a switch or valve and the like, said second piston movement occurring in response to a predetermined condition.

* * * * *

UNITED STATES PATENT AND TRADEMARK OFFICE
CERTIFICATE OF CORRECTION

PATENT NO. : 4,003,294
DATED : January 18, 1977
INVENTOR(S) : Donald L. Parker

It is certified that error appears in the above-identified patent and that said Letters Patent are hereby corrected as shown below:

Column 3, line 10, "seal" should read seat.

Signed and Sealed this

Tenth Day of May 1977

[SEAL]

Attest:

RUTH C. MASON
Attesting Officer

C. MARSHALL DANN
Commissioner of Patents and Trademarks